March 16, 1926.
E. METTLER
PLOW ATTACHMENT
Filed Dec. 17, 1924
1,577,341
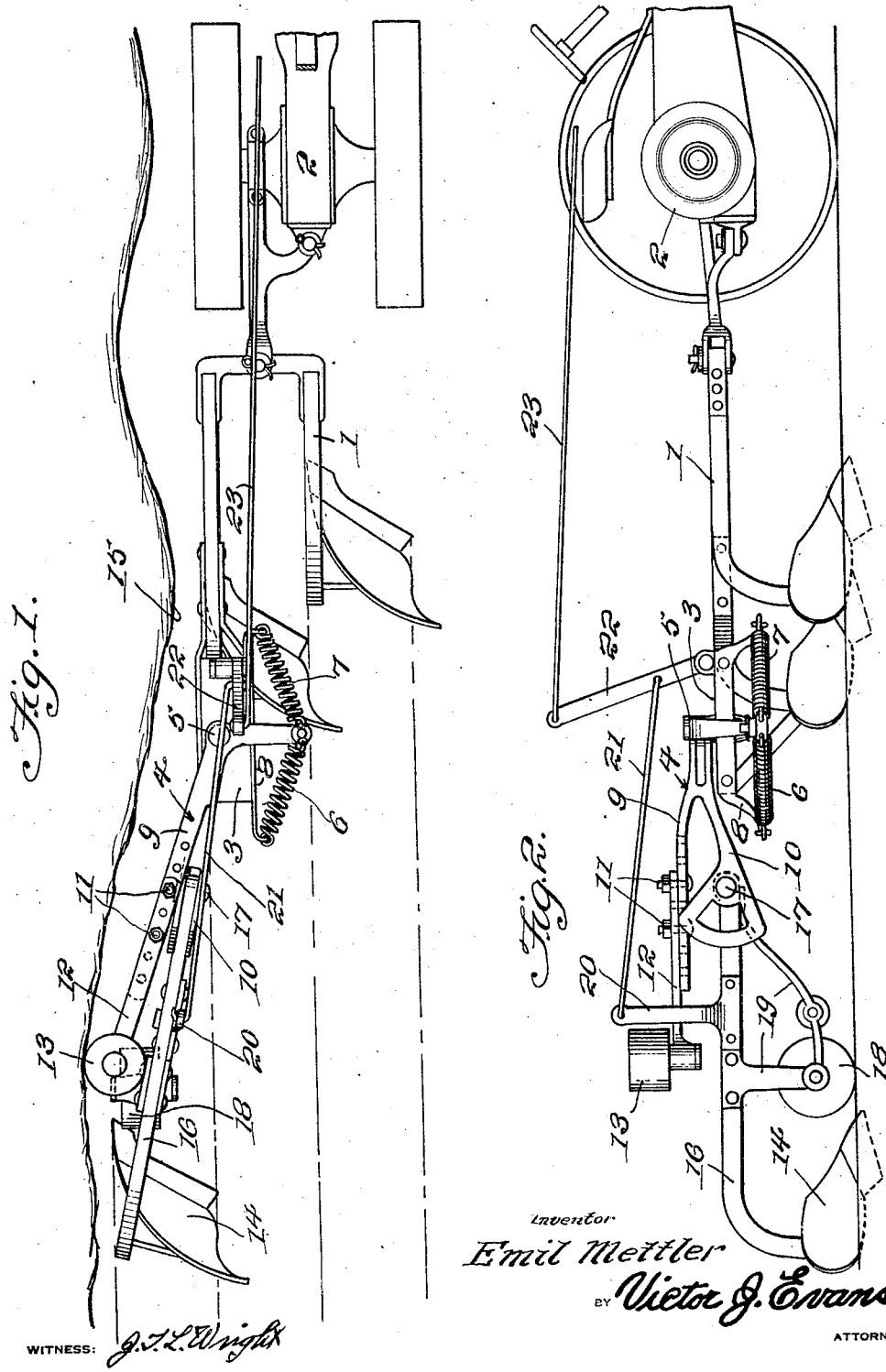

Patented Mar. 16, 1926.

1,577,341

UNITED STATES PATENT OFFICE.

EMIL METTLER, OF CLAYTON, SOUTH DAKOTA.

PLOW ATTACHMENT.

Application filed December 17, 1924. Serial No. 756,583.

*To all whom it may concern:*

Be it known that I, EMIL METTLER, a citizen of the United States, residing at Clayton, in the county of Hutchinson and State of South Dakota, have invented new and useful Improvements in Plow Attachments, of which the following is a specification.

The object of my invention is to provide an attachment for tractor drawn plows, designed and adapted to plow close to a row of vines in a vineyard without liability of injuring the vines, and this notwithstanding a plowman is not employed for the manipulation or guidance of the attachment.

To the attainment of the foregoing, the invention consists in the improvement as hereinafter described and claimed.

In the accompanying drawings, forming part of this specification:

Figure 1 is a plan view showing my attachment in use.

Figure 2 is a side elevation of the same.

Similar numerals of reference designate corresponding parts in both views of the drawings.

I show in Figures 1 and 2, a gang plow connected thereto and designed to be drawn by a tractor 2, and also show my novel attachment in proper association with the gang plow.

The attachment comprises a bracket 3 appropriately fixed on the rear portion of the frame of the gang plow, and the attachment also comprises a bell crank lever 4 pivotally mounted at 5 on the said bracket. One arm of the bell crank lever 4 is connected to retractile springs 6 and 7, the said springs being connected to an arm 8 of the bracket and to the frame of the gang plow respectively. The comparatively large arm of the bell crank lever 4 extends generally rearward from the bracket 3 and includes upper and lower portions 9 and 10, the upper portion 9 having adjustably connected thereto as at 11 an arm 12 on which is carried an upright roller 13 of rubber or other soft material and designed and adapted to contact with the vines in a row, with a view to guiding the plow 14 of the attachment so as to prevent the said plow 14 from injuring the vines irrespective of whether or not the row of vines is irregular as indicated at 15 in Figure 1. The plow 14 is carried by a beam 16 and the said beam 16 is pivotally connected at 17 to the portion 10 of the bell crank 4 so that the plow can swing up and down. A wheel 18 is provided on the beam 16 and arranged in front of the plow 14 so as to pass over any obstruction in the path of the plow and enables the plow to ride safely over said obstructions. The wheel 18 is carried in hangers 19, and it will be noted that the beam 16 is provided with an upright 20, connected through a link rod 21 with a lever 22 on the bracket 3, and designed to be connected through a rod 23 with adjusting means on the tractor 2. This provision is made in order that the tractor driver can raise and lower the plow 14 as the occasion demands.

In the practical operation of my improvement it will be noted that the springs 6 and 7 in conjunction with the roller 13 will assist the plow 14 following a line of vines in such manner that there would be no liability of the plow 14 injuring the roots of the vines. In this connection it will be noted that no attendant is necessary to guide the plow 14 in its work as it trails behind the gang plow 1, also that the springs 6 and 7 may be depended upon to yieldingly hold the plow 14 laterally to its work, and to cushion the bell crank 4 when the same is swung laterally by the action of the vines against the roller 13.

Having described my invention, what I claim and desire to secure by Letters-Patent, is:

1. The combination with a plow, of an attachment arranged to trail behind the plow in connection therewith, the said attachment comprising a laterally swinging bell crank member, a soft roller carried by said member and adapted to contact with a row of vines in a vineyard, a plow carried by and movable laterally with said laterally swinging member, and springs arranged in front and rear of the forward end of the bell crank member and connected to said end and the plow, said springs yieldingly holding the attachment in contact with the row of vines.

2. The combination with a plow, of an attachment arranged to trail behind the plow in connection therewith, the said attachment comprising a laterally swinging member, a soft roller carried by said member and adapted to contact with a row of vines in a vineyard, a plow carried by and movable laterally with said laterally swinging member, and spring means for yieldingly holding the attachment in contact with a row of vines, the said soft roller being adjustably connected to the laterally swinging member, and the said plow being carried by a vertically swinging beam pivotally connected to the laterally swinging member and equipped with a roller movable in front of the plow.

3. The combination with a plow, of an attachment arranged to trail behind the plow in connection therewith, the said attachment comprising a laterally swinging member, means on said laterally swinging member for contact with a row of vines in a vineyard, a plow carried by said laterally swinging member, spring means cooperating with the laterally swinging member to yieldingly hold the said contact means against the vines in a row, and other spring means for preventing too great pressure of the contact means against said vines.

In testimony whereof I affix my signature.

EMIL METTLER.